(12) United States Patent
Wisnieski et al.

(10) Patent No.: US 6,588,725 B1
(45) Date of Patent: Jul. 8, 2003

(54) VALVE

(75) Inventors: Henry Bogustaw Wisnieski, Evesham (GB); Joseph Eugene Holland, Erdington (GB)

(73) Assignee: IMI Cornelius Inc., Anoka, MN (US)

( * ) Notice: Subject to any disclaimer, the term of this patent is extended or adjusted under 35 U.S.C. 154(b) by 0 days.

(21) Appl. No.: 09/555,280

(22) PCT Filed: Nov. 27, 1998

(86) PCT No.: PCT/GB98/03564

§ 371 (c)(1),
(2), (4) Date: Aug. 7, 2000

(87) PCT Pub. No.: WO99/29619

PCT Pub. Date: Jun. 17, 1999

(30) Foreign Application Priority Data

| Dec. 9, 1997 | (GB) | ............................................. | 9726002 |
| Jun. 3, 1998 | (GB) | ............................................. | 9811912 |

(51) Int. Cl.⁷ .......................... F16K 47/00; F16K 31/02
(52) U.S. Cl. ................... 251/123; 251/125; 251/129.15
(58) Field of Search ............................... 251/123, 125, 251/319, 129.15

(56) References Cited

U.S. PATENT DOCUMENTS

| 2,516,825 A |   | 7/1950  | Hejduk et al.              |
|-------------|---|---------|----------------------------|
| 2,649,273 A | * | 8/1953  | Honegger ............ 251/118 |
| 2,748,982 A |   | 6/1956  | Copping                    |
| 3,073,349 A |   | 1/1963  | Mitchell                   |
| 3,110,320 A | * | 11/1963 | Rosenberger ........ 251/123 |
| 3,695,290 A |   | 10/1972 | Evans                      |
| 3,695,390 A | * | 10/1972 | Evans .................. 251/123 |
| 3,851,668 A |   | 12/1974 | Benjamin                   |
| 3,887,159 A | * | 6/1975  | Obermaier et al. ..... 251/11 |
| 3,955,794 A | * | 5/1976  | Hankosky ............ 251/123 |
| 4,108,134 A |   | 8/1978  | Malec                      |
| 4,197,877 A | * | 4/1980  | Winiasz ............ 137/489.5 |
| 4,763,687 A | * | 8/1988  | Arth et al. ........ 137/454.5 |
| 5,044,604 A | * | 9/1991  | Topham et al. ....... 251/120 |
| 5,050,568 A | * | 9/1991  | Cook .................... 40/463 |
| 5,357,950 A | * | 10/1994 | Wippler et al. ...... 128/204.26 |
| 5,822,958 A | * | 10/1998 | Davis .................. 251/123 |
| 6,050,543 A | * | 4/2000  | LaGreca et al. ..... 251/129.21 |

FOREIGN PATENT DOCUMENTS

| EP | 0 692 681 A1 | 1/1996  |
| FR | 2 416 424    | 8/1979  |
| GB | 625685       | 7/1949  |
| GB | 634362       | 3/1950  |
| GB | 1 507 353    | 5/1975  |
| GB | 1 444 429    | 7/1976  |
| GB | 1 551 170    | 10/1977 |

* cited by examiner

*Primary Examiner*—Kevin Shaver
*Assistant Examiner*—David A. Bonderer
(74) *Attorney, Agent, or Firm*—Sten Erik Hakanson

(57) ABSTRACT

A settable control valve (13, 50, 113) has a closure member moveable within a passage-way (17, 71, 81A, 101, 117), there being at least one groove for fluid flow (25, 26, 44, 56, 57, 97, 98, 107, 108, 125, 126) in the wall of the passageway. The groove is of varying transverse cross-sectional area along its length and the closure member may be set at different positions so as to expose varying lengths of the groove to fluid flow, hence enabling different fluid flow rates to be established.

14 Claims, 12 Drawing Sheets

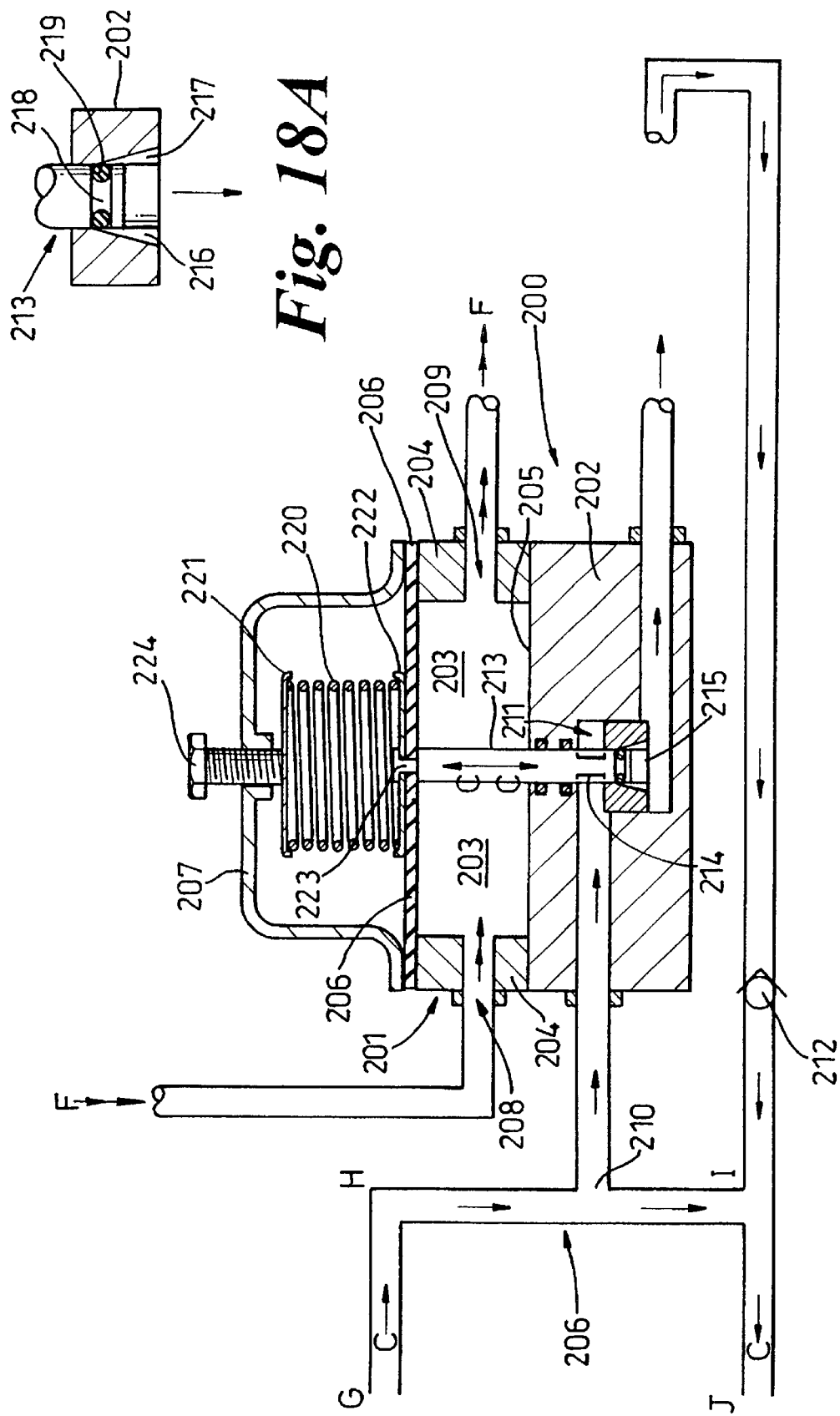

VALVE

This invention relates to a valve. It is of particular applicability to a control valve that can be used as a settable coolant flow valve or as a dispense valve for beverages, e.g. to control flow of syrups and carbonated water to a dispenser. However, it will be appreciated that the invention is not limited to valves for such uses.

Thus it is an object of the invention to provide a valve that is suitable for use as a control valve that can be maintained for a period of time in a partially open configuration or can be used in a situation where frequent opening and closing of the valve is required.

It is also an object of the invention to provide a valve which can be set with precision to any position in a desired range of partially open configurations between the fully closed and fully open positions and which can demonstrate a high degree of flow linearity between the fully closed and fully open positions.

Ingress of particles of dirt can cause problems in many valve systems. In addition to getting trapped between valve closure surfaces, where they can damage valve ports or seats, dirt particles can obstruct the cross-sectional area available for flow, and thereby alter predicted flow rates for a given valve opening. Thus it will be appreciated that this can be a particularly serious problem if a valve is particularly intended for use in a partially open, set configuration.

It is a further object, therefore, of the present invention, to provide an improved control valve in which the problems caused by dirt particles can be avoided or at least ameliorated.

Accordingly the invention provides a valve, the valve comprising a substantially rigid housing containing a passageway between an inlet and an outlet of the valve, a closure member movable in the passageway from a first position in which the valve is fully closed to a second position in which the valve is fully open, the closure member engaging the wall of the passageway to seal the passageway, the wall of the passageway or the closure member defining at least one groove, the groove having a transverse cross section that increases in area in the downstream or upstream direction, whereby movement of the closure member from the first position towards the second position opens a flow channel through the groove.

Thus it will be appreciated that flow through the valve in the partially to fully open positions is through the groove or grooves.

Preferably the closure member comprises a substantially rigid piston, which may be of the same material as the housing, e.g. of metal, plastics material or ceramic material. Suitably rigid plastics materials include, for example, acetals and acrylonitrile-butadiene-styrene (ABS) copolymers. The grooves may be, for example, cut or moulded into the material of the passageway wall or closure member by conventional means depending on the material used.

The valve may conveniently be accurately set in any desired position from fully closed to fully open by means of, for example, a lever mechanism, a stepper motor, e.g. of the pulsed magnetically driven type, a proportional solenoid activator, a diaphragm operated mechanism, or the like. When the valve is to be repeatedly opened and closed a stepper motor or proportional solenoid actuator means may be preferred. Stepper motors, for example, can provide particularly accurate incremental increases or decreases in flow control.

The closure member may carry one or more sealing rings to engage the wall of the passageway in the first position, i.e. the closure member may engage the wall of the passageway by means of the sealing ring(s) to close the outlet. Alternatively, sealing rings for this purpose may be located in the wall of the passageway. In a yet further embodiment the closure member and passageway may be a precision fit in the first position to close the outlet without a seal.

Accordingly, in one specific embodiment the invention provides a control valve, the valve comprising a housing containing a passageway between an inlet and an outlet of the valve, a closure member movable in the passageway from a first position in which the valve is fully closed to a second position in which the valve is fully open, the closure member carrying a seal to engage the wall of the passageway to seal the passageway, the wall of the passageway defining at least one groove, the groove being located in the passageway wall downstream of the engagement between the wall and the seal in said first position, the groove having a transverse cross-section that increases in area in the downstream direction, whereby movement of the closure member from the first position towards the second position opens a flow channel through the groove.

As indicated above, the valves of the invention are particularly useful for incorporation into the dispense head of a beverage dispenser where they may be used to control the flow of fluids to be mixed at the dispense valve, e.g. syrup and carbonated water, or they may be incorporated into a coolant manifold for use in cooled beverage dispense systems. A typical manifold may contain a plurality of valves controlling outlets for the coolant, the valves being spaced along a common manifold. Each valve may comprise a housing containing a passageway from the common manifold to the valve outlet.

In a typical coolant manifold, the passageway of each control valve in the manifold will usually comprise at least a portion in the form of a right cylinder, and the closure member will be a corresponding cylinder of outside diameter slightly less than the internal diameter of the passageway, the closure member having an "O"-ring seal attached around its outer surface to seal against the passageway wall. In such an arrangement, the grooves may be, for example, a pair of tapering V-shaped grooves opposed across the right cylinder, the cross-section of each groove increasing, for example, in the downstream direction. The grooves may, of course, have a different tapering cross-section, e.g. of generally circular, rectangular or other shape, but for convenience the invention will be more specifically described below with reference to the use of V-grooves although it will be appreciated that it is not intended to be limited thereto.

Depending on the desired particular construction, the V groove or grooves in the passageway may increase in cross-sectional area in the upstream or downstream direction. In the latter case, the valves have the added advantage of having greater self-cleaning properties, i.e. larger particles can pass more readily through the valve in the open position without causing partial blockage than for a conventional valve having an annular passageway of the same throughput.

When a conventional valve is used in a partially open position, i.e. between the above-mentioned first and second positions, it will be appreciated that the partially open passageway, in the case of a tapering cylindrical passageway, is a narrow annular passageway between the wall and the closure member. In the absence of the groove(s) of the invention, dirt particles can get trapped in this narrow annular passageway and thereby partially block the passageway and reduce the desired throughflow of, e.g. coolant.

However, the presence of the groove(s) of appropriate and increasing cross-sectional area to provide the desired flow rates at different valve openings, enables dirt particles that would otherwise have been trapped to flow through the groove(s) leaving the valve unblocked and the rate of flow at the required level. As the valve opening is gradually increased to full, the increasing cross-sectional area of the groove(s) enables a dirt particle of a particular size to pass through sooner than it would otherwise have done or, at any given partial opening of the valve, grit particles of larger size can pass through than could have done so in a conventional arrangement without the grooves. The valve can conveniently be flushed to remove any trapped particles by fully opening it.

As indicated above, conveniently the passageway and closure member are of generally cylindrical transverse cross-section and a pair of grooves may be opposed diametrically across the passageway. However, it will be appreciated that the invention is not limited to such constructions.

Where more than one groove is provided in the passageway, it is not essential that all the grooves are positioned to commence and finish at the same distance along the passageway.

The progressive increase or decrease in area of the groove flow channels can provide excellent linear flow through valves of the invention.

Embodiments of the invention will now be described by way of example only with reference to the accompanying drawings in which:

FIG. 18 is a diagrammatic representation in part section of a heat exchanger having a diaphragm setting mechanism for a valve used in a coolant flow line; and FIG. 18A is an enlarged view of a portion of FIG. 18.

Figure 1:
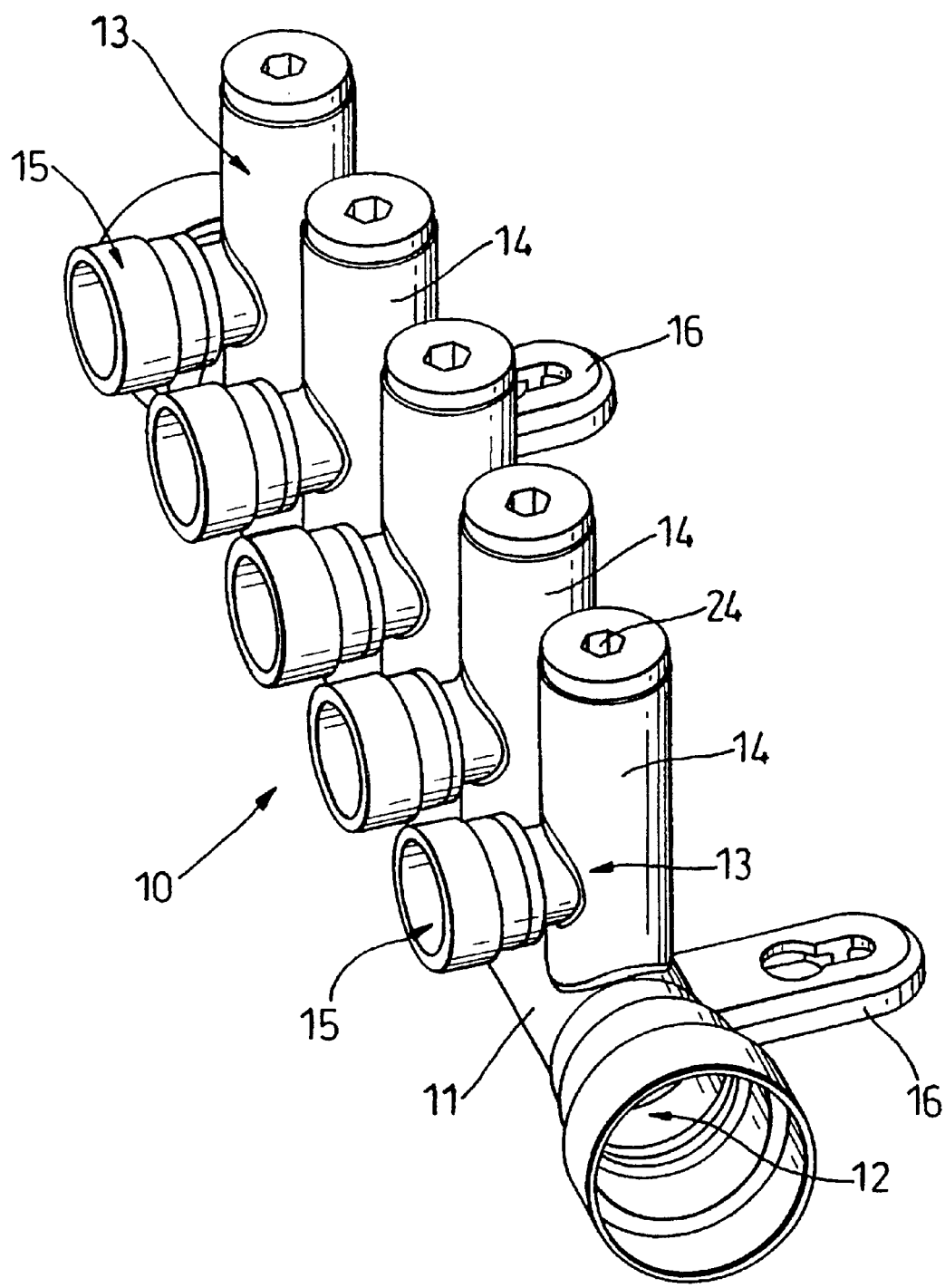
FIG. 1 is an isometric view of a coolant manifold for use in a cooled beverage dispense system.

In FIG. 1, a coolant manifold 10 has a common manifold body 11 defining manifold passageway 12. Body 11 carries a series of outlet valves 13, each comprising a housing 14 and an outlet 15, and has integral lugs 16 by means of which it can be secured in the desired position.

Figure 2:
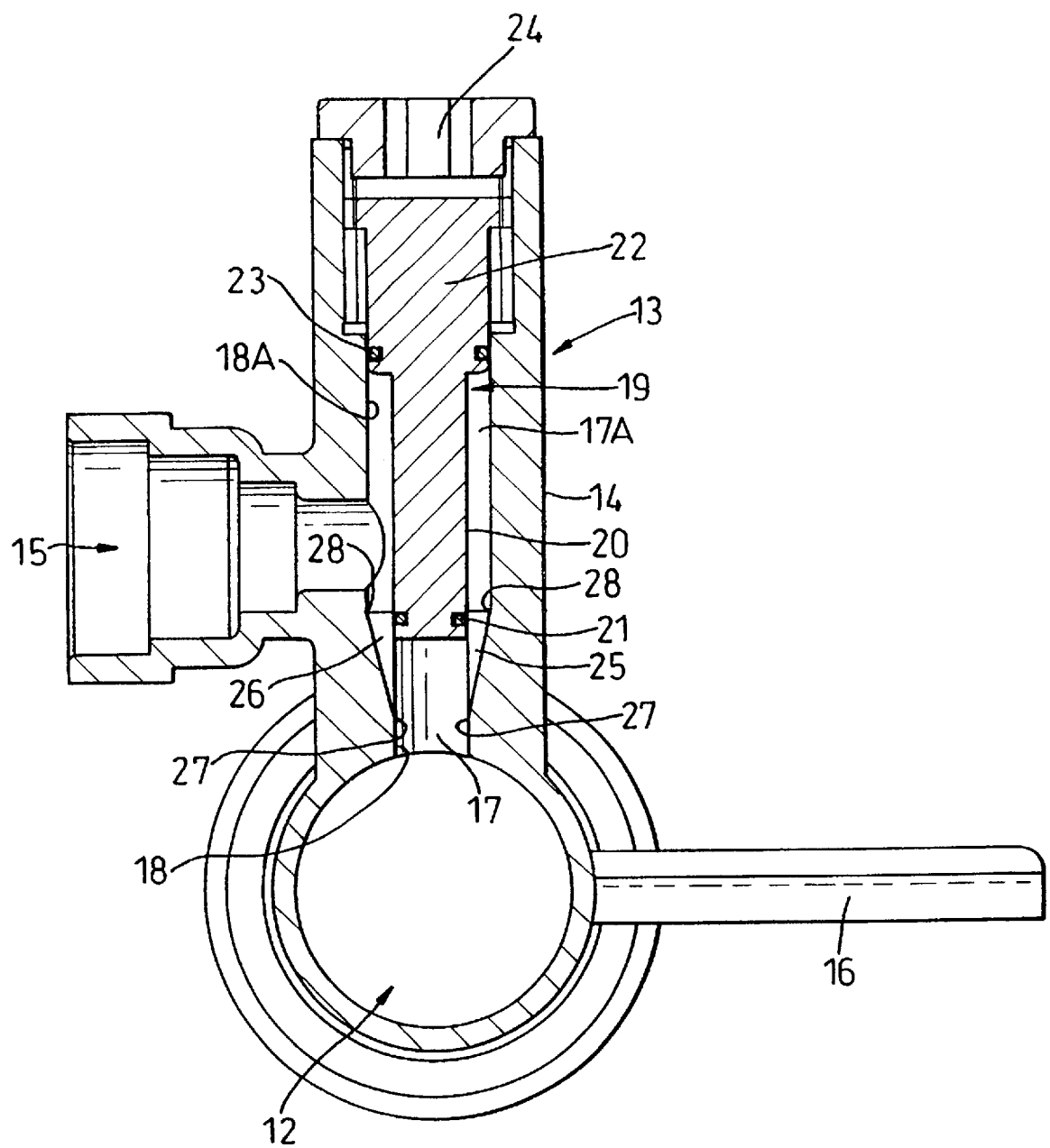
FIG. 2 is a cross-section through one of the valves of the manifold of FIG. 1.

As shown in FIG. 2, outlet 15 of valve 13 is connected to manifold passageway 12 by valve passageway 17. Passageway 17 is of right cylindrical shape and is defined by the lower, cylindrical wall 18 of housing 14.

Housing 14 contains a valve closure member 19 having a cylindrical stem portion 20 carrying towards its inlet (lower) end an O-ring 21. Stem portion 20 is of external diameter relative to the diameter of valve passageway 17 such that its O-ring 21 seals against wall 18.

Stem portion 20 continues into a stepped portion 22 of the closure member 19 which is of larger diameter than stem portion 20 and seals by means of an O-ring 23 against the housing wall 18A at an upper, wider cylindrical chamber 17A into which passageway 17 leads. Stepped portion 22 of closure member 19 is connected at its end remote from stem portion 20 to an Allen key operated means 24 by means of which the closure member 19 may be set to the desired position, i.e. raised and lowered to fully close, partially open or fully open a flow channel through valve passageway 17. (A similar setting arrangement is shown and described in more detail with reference to FIG. 13 below.).

The valve is shown in the almost fully open position in FIG. 2. A pair of opposed grooves 25, 26 is formed in the housing wall 18. Each groove extends from a point 27 on wall 18 which is downstream of the position at which O-ring 21 contacts wall 18 in the fully closed position of the valve, to a point 28 where the wider chamber 17A commences and which represents the fully open position of the valve.

Figure 3:
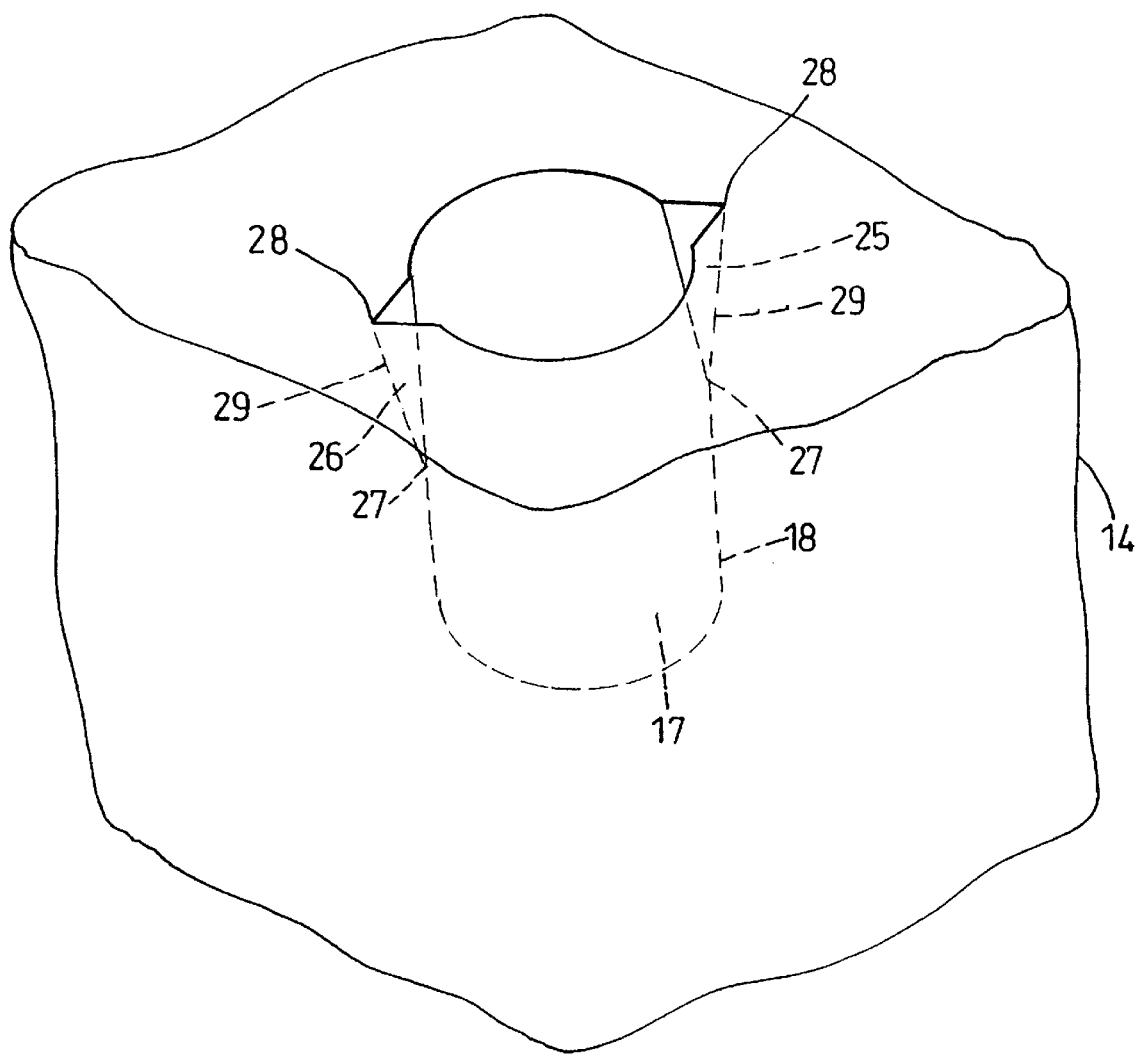
FIG. 3 is a schematic view of a portion of the housing containing the passageway through the valve of FIG. 2.

The grooves 25, 26 are of tapering cross-section, as shown more clearly in FIG. 3, and increase in cross-sectional area in the downstream direction. As shown the grooves are of generally "V" cross-section, and the base 29 of each V-shaped groove extends outwardly, i.e. deepens the groove, in the downstream direction. The arms of the "V" may also open outwardly, i.e. the angle of the "V" may increase, along the groove in the same direction.

Figure 4:
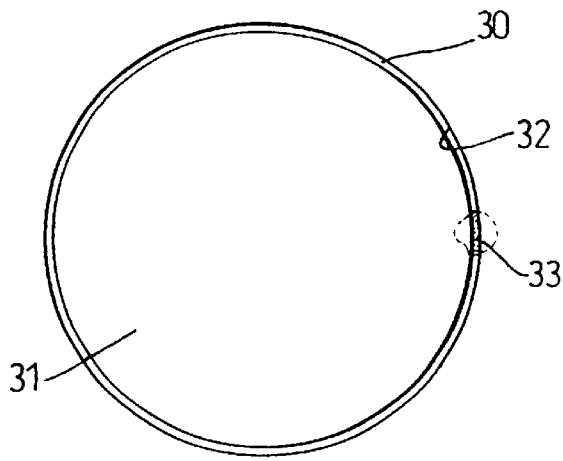
FIG. 4 is a schematic section through a partially open valve passageway without a groove of the invention.

FIG. 4 shows a conventional annular valve passageway 30 defined between a cylindrical valve closure member plug 31 and a cylindrical valve wall 32. A particle of dirt 33 is too large to pass through the passageway 30 and is trapped, causing a partial blockage of the passageway.

Figure 5:
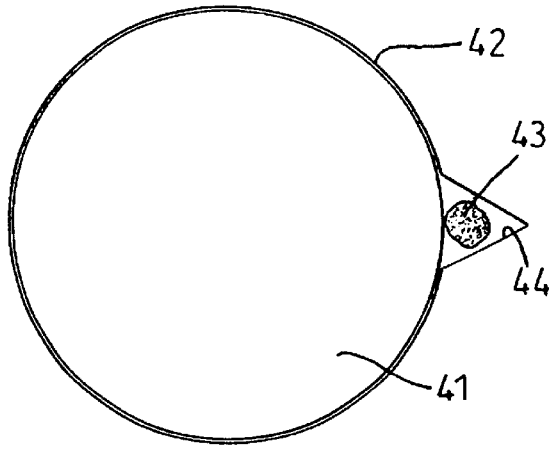
FIG. 5 is a similar view to FIG. 4 of a partially open valve passageway provided by a groove of the invention.

In FIG. 5 a valve according to the invention has a flow channel opened between a cylindrical valve plug 41 and cylindrical valve wall 42. The flow channel is provided by a tapering groove 44 in wall 42, the groove being of cross-sectional area at this particular valve opening sufficient to allow through passage to a dirt particle 43 of the same size as particle 33 in FIG. 4. It should be noted that for a particular cross-sectional flow area (and hence flow rate) identical dirt particles would be trapped by prior art valves but free to pass through a valve according to the invention. This is because the prior art valve flow channel is annular in shape and hence always has a relatively small (radial) dimension. With the new valve the flow channel is groove shaped e.g. a vee or a polygon seen in plan view cut into the side of the valve wall 42.

Figure 6:
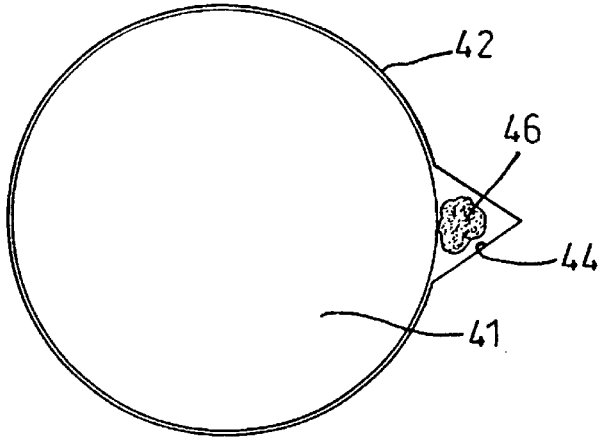
FIG. 6 is a similar view to FIG. 5 with the valve still partially open but to a greater extent than in FIG. 5.

In FIG. 6, the flow channel is shown for a valve setting of increased flow rate. The groove 44 is of larger cross-sectional area than in FIG. 5, due to the tapering configuration of the groove, allowing through passage to an even larger dirt particle 46.

It will be appreciated that in FIGS. 5 and 6 the plug 41 and valve wall 42 have been shown for clarity with a slight gap between them although in practice they are sealed so as to provide no annular flow passageway there between.

Thus in the above embodiments the conventional annular flow passage is replaced by a groove of dimensions to provide the same required flow rate at any given valve opening and the risk of blockage of the flow channel is considerably reduced.

Figure 7:
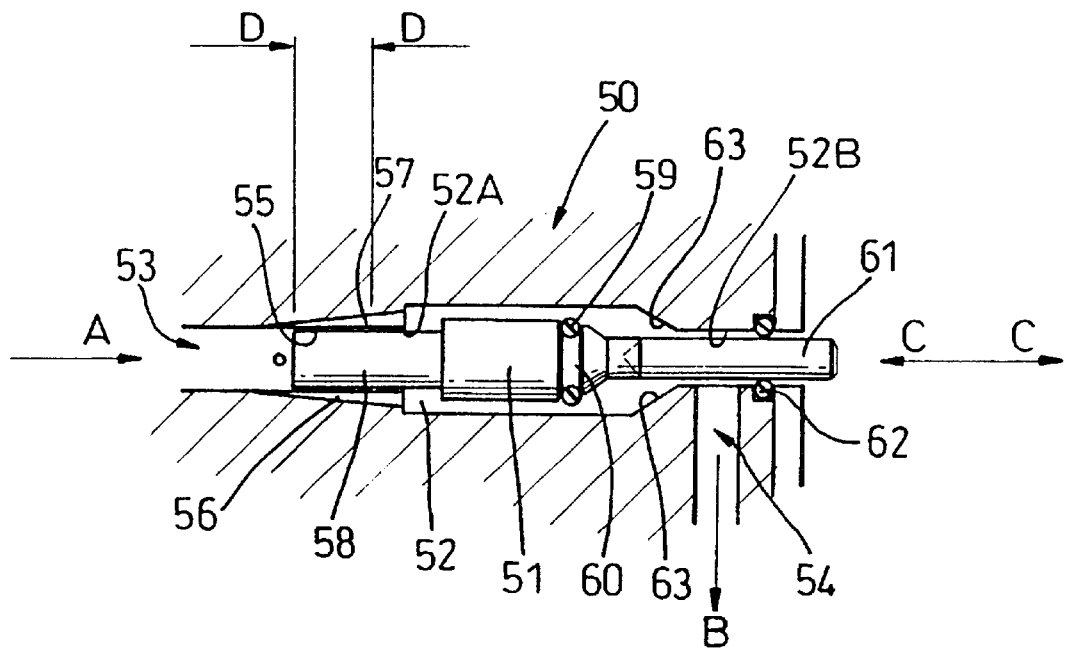
FIG. 7 is a diagrammatic illustration in part section of a second valve according to the invention.

In FIG. 7, a valve 50 comprises a closure member in the form of a piston 51 in a passageway 52 leading from an inlet 53 to an outlet 54, the outlet extending at right angles to passageway 52. Fluid flow is in the direction of the arrows A and B (which direction will be similarly indicated in other embodiments below.).

Wall 55 of the passageway 52A adjacent inlet 53 is of cylindrical cross-section but with a pair of grooves 56, 57 diametrically opposed across the passageway. The grooves are of generally V configuration and increase in cross-sectional area as they extend in the downstream direction. A narrower extension 58 of piston 51 is a close sliding fit in passageway 52A.

At its downstream end piston 51 carries a sealing ring 59 in an annular groove 60. Downstream of groove 60 piston 51 tapers to a narrower extension 61 which slides in a narrow extension 52B of passageway 52 and engages a sealing ring 62 in the wall of passageway 52B. Sealing ring 62 prevents leakage of fluid between piston 51 and the wall of passageway 52B beyond outlet 54.

The wall of passageway 52 has a tapered section 63 leading to its narrower extension 52B and seal 59 of piston 51 engages section 63 to close outlet 54 which is downstream thereof.

Piston 51 is moved backwards and forwards in passageway 52 to open and close the valve by means of its extension 61 being attached to a stepper motor (not shown) or other suitable means. This movement is indicated by arrows C—C.

The V grooves enable precise control of fluid flow with the flow control band width being indicated between arrows D—D. It has a self-cleaning flow path through the increasing groove cross-section and is pressure closed, although spring-assistance may be provided, if desired.

It will be noted that the upstream end of extension 58 of piston 51 will be in the maximum flow position of the V grooves at the moment that seal 59 engages wall portion 63 and closes the outlet.

The valve can be retrofitted into existing equipment.

Figure 8:
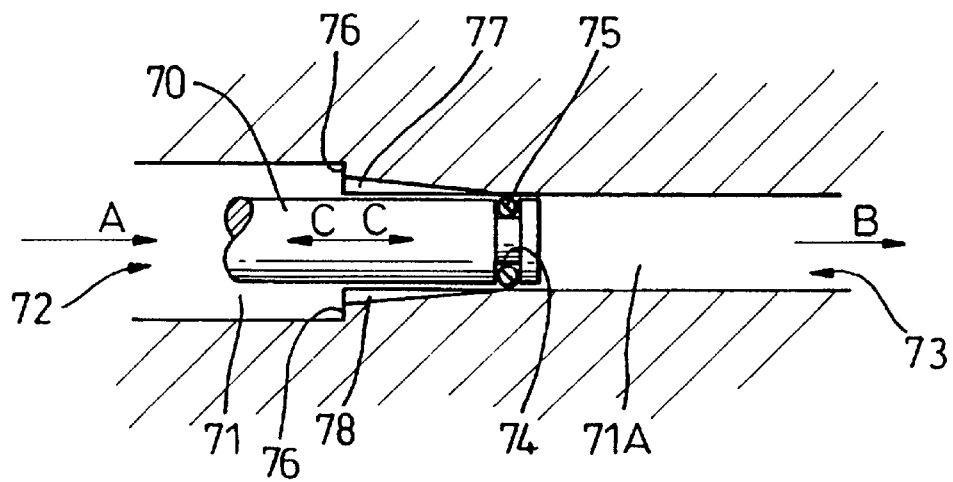
FIG. 8 is a similar illustration of a third valve of the invention.

In FIG. 8 valve closure member 70 is a cylindrical piston rod moveable backwards and forwards as indicated by arrows C—C in a passageway 71 between an inlet 72 and an outlet 73. Piston 70 is of constant diameter along its length and has an annular groove 74 containing a sealing ring 75 adjacent its downstream end.

Passageway 71 at inlet end 72 is of greater diameter than piston 70 and narrows via a stepped wall portion 76 to a narrower portion 71A in which piston 70 is a sliding fit and against the wall of which seal 75 seals in the closed position. A pair of diametrically opposed V grooves 77, 78 are provided in the wall defining narrower passage portion 71A, the grooves commencing at stepped wall portion 76 and narrowing in the downstream direction.

The upstream end of piston 70 is attached to a stepper motor (not shown) or other means to move the piston to open and close the valve.

The valve provides a gradual increase/decrease in pressure/flow on opening and closing. This construction provides minimal pressure on the seal in the closed position and low torque on the, e.g., stepper motor. There is no end stop load on the motor on closing the valve.

Figure 9:
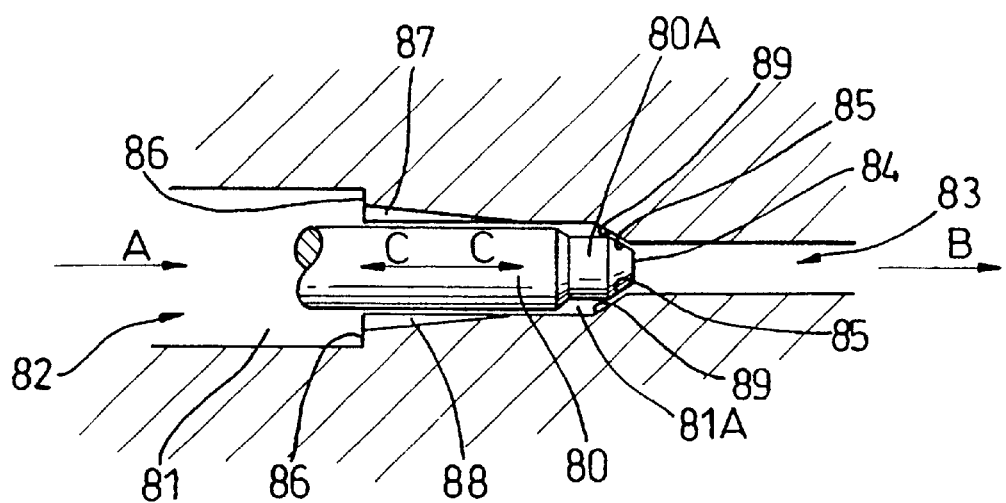
FIG. 9 is a similar view of a fourth valve of the invention.

In FIG. 9, the valve closure member is a piston rod 80 of cylindrical configuration movable backwards and forwards as indicated by arrows C—C in a passageway 81 between an inlet 82 and an outlet 83. Piston 80 tapers to a narrower nose 80A at its downstream end and nose 80A itself tapers at its downstream end to a flat end surface 84. The tapering portion 85 of the nose leading to the end surface 84 provides the sealing means to close the outlet as is described below.

As with the valve of FIG. 8, passageway 81 at its inlet end is of greater diameter than piston 80 and narrows via a stepped wall portion 86 to a narrow portion 81A in which piston 80 is a sliding fit. A pair of diametrically-opposed V grooves 87, 88 are provided in the wall defining narrower passage portion 81A, the grooves commencing at stepped wall portion 86 and narrowing in the downstream direction.

The upstream end of piston 80 is attached to a stepper motor (not shown) or other means to move the piston to open and close the valve, opening of the valve allowing flow through grooves 87 and 88.

Passageway portion 81A narrows at its downstream end by means of a tapered wall portion 89 and leads thereby to narrower outlet 83. Tapered wall portion 89 and tapered portion 85 of the nose of piston 80 are a mating, close tolerance fit in the closed position of the valve, whereby the outlet is closed without need for a separate sealing ring.

Thus this construction has no sealing ring to wear and provides a gradual increase/decrease of pressure/flow on opening and closing of the valve.

Figure 10:
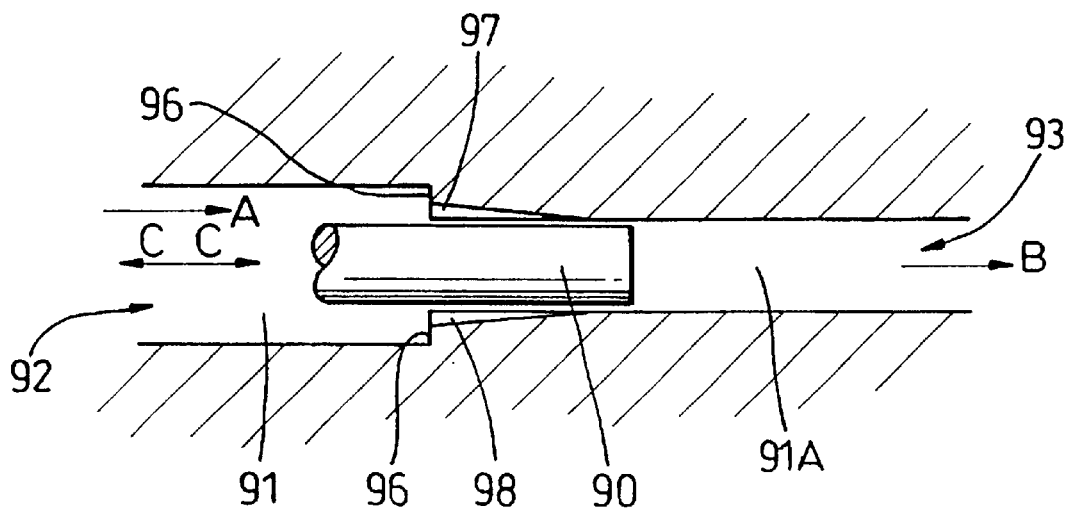
FIG. 10 is a similar view of a fifth valve of the invention.

In FIG. 10 is illustrated another valve of the invention that does not require a separate sealing ring. The valve closure member is a cylindrical piston 90 movable backwards and forwards as indicated by arrows C—C in a passageway 91 between an inlet 92 and an outlet 93.

Again passageway 91 at its inlet end is of greater diameter than piston 90 and narrows via a stepped wall portion 96 to a narrower portion 91A in which piston 90 is a sealing fit. Thus piston 90 is a precision fit into a bore of passageway portion 91A.

A pair of diametrically opposed V grooves 97, 98 are provided in the wall defining narrower passage portion 91A, the grooves again commencing at stepped wall portion 96 and narrowing in the downstream direction.

Again, the upstream end of piston 90 is attached to a stepper motor (not shown) or other means to move the piston to open and close the valve, opening of the valve allowing flow through grooves 97 and 98.

As with the FIG. 9 construction, this valve may be "seal-less". It also provides a gradual increase/decrease of pressure/flow on opening and closing, puts minimal pressure on the sealing surfaces when closed and low torque on the motor and has no end stop loading on the motor.

Figure 11:
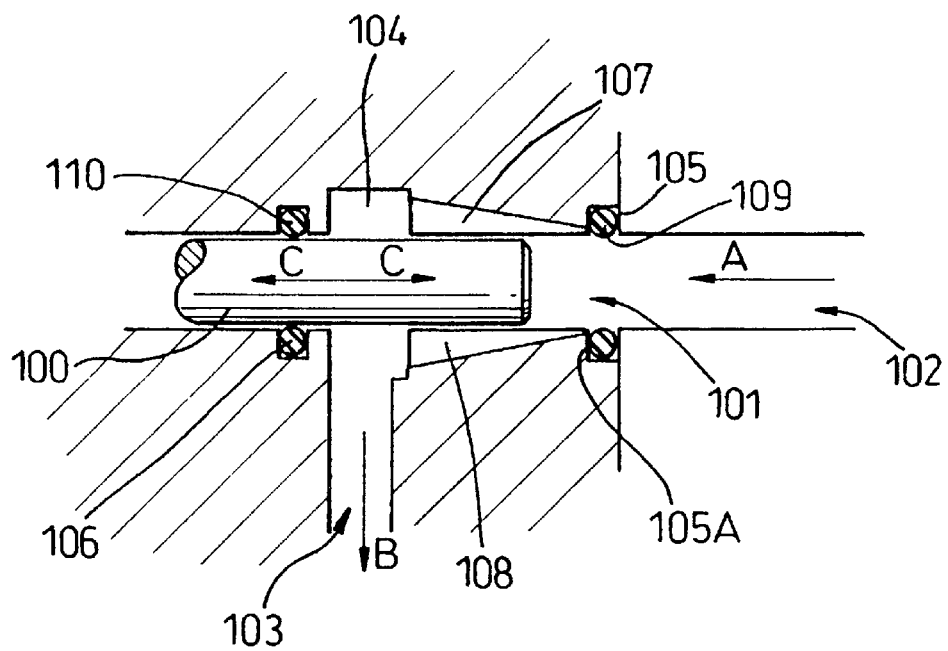
FIG. 11 is a similar view of a sixth valve of the invention.

In FIG. 11, the closure member is a cylindrical piston 100 movable backwards and forwards (in the direction C—C) in a passageway 101 between an inlet 102 and an outlet 103 which leads off at right angles from passageway 101 partway along the length of the piston.

The wall defining passageway 101 has a pair of diametrically-opposed V grooves 107, 108 between the inlet and an annular chamber 104 from which outlet 103 leads off. The grooves widen in the downstream direction to be at their widest as they reach chamber 104, which chamber forms part of and lies centrally of passageway 101.

The walls of passageway 101 define a pair of annular recesses 105, 106, each recess carrying a sealing ring 109, 110, respectively.

Figure 12:
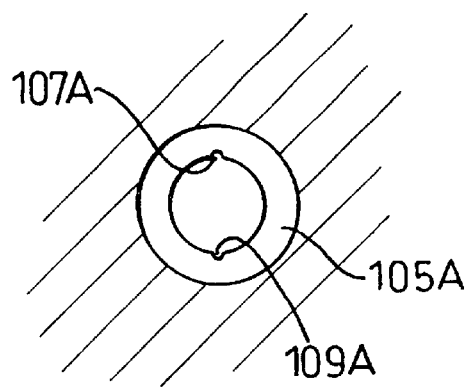
FIG. 12 is a view in the direction of arrow A of FIG. 11.

Recess 105 and its sealing ring 109 lie at the upstream end of V section grooves 107, 108, and piston 100 seals against ring 109 in the valve closed position. The seal 109 and the grooves 107 and 108 are so positioned that the upstream end of each V groove commences just downstream of the seal to prevent hydraulic lock occurring on the valve closing. As can be seen in FIG. 12, from which the seal 109 has been removed for clarity, the upstream ends 107A, 108A of grooves 107 and 108 just extend to breakthrough the downstream wall 105A of recess 105.

Recess 106 and its sealing ring 110 are positioned in passageway 101 beyond chamber 104 and outlet 103 and the piston 100 is a sliding sealing fit in ring 110 as it moves to open and close the valve.

Again, this construction provides gradual opening and closing of the valve, the sealing rings are subjected to little wear and the V grooves are self-cleaning in the flow direction shown.

All the above valves of the invention provide a combined flow control and cut off means in a small compact, retrofittable unit.

The flow direction may, if desired be reversed in each of the above embodiments but it will be appreciated that the improved self-cleaning effect will be achieved only where the V grooves broaden in the direction of flow.

Figure 13:
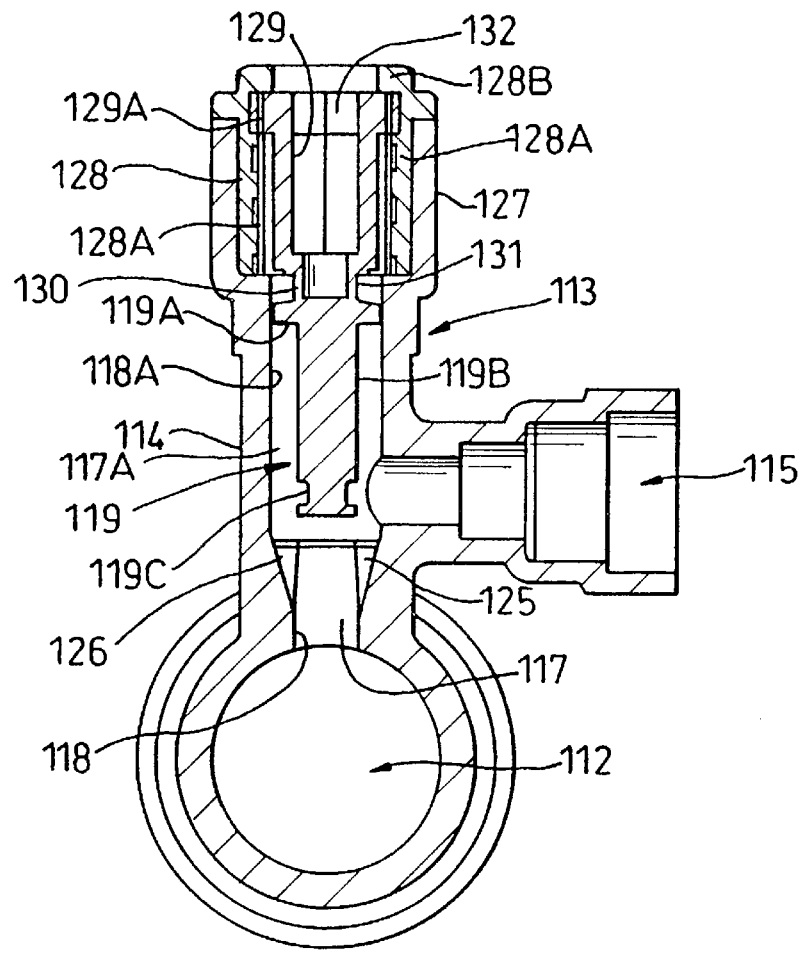
FIG. 13 is a section through a valve of the invention showing one arrangement for accurate setting of the position of the closure member in the valve.

In FIG. 13 valve 113, which is similar in general construction to the valve of FIG. 2, comprises a housing 114 and controls flow from manifold passageway 112 to an outlet 115 via a lower narrower valve passageway 117 and an upper wider passageway 117A, defined by walls 118 and 118A respectively. A valve closure member 119 can be raised or lowered by a mechanical setting mechanism to be described in more detail below between a fully open position, as illustrated, and a fully closed position respectively. The passageway wall 118 contains a pair of opposed V-grooves 125, 126 which increase in cross-section in the downstream direction and the valve operates in a similar manner to that described with reference to FIG. 2.

Closure member 119 has an annular upper portion 119A which is a sliding fit along passageway wall 118A and a narrower tail portion 119B, which is a sliding fit in passageway wall 118. Adjacent its lower end, tail portion 119B has an annular recess 119C to carry an O-ring (not shown) to seal against wall 118 below the V-grooves in the fully closed position of the valve.

The setting of the closure member 119 is operated as follows. At its upper end housing 114 continues into a hollow cylindrical extension 127 which contains a tightly press-fitted internally-threaded cylindrical bush 128. An externally-threaded hollow cylindrical insert 129 is threadingly engaged inside bush 128. Bush 128 carries an internal thread 128A for the whole of its length whereas insert 129 has an external thread 129A only for a short portion of its length at its upper end. Insert 129 is connected to the upper end of closure member 119 by a connection member 130 of smaller diameter than the diameters of insert 129 and closure member 119. This results in an annular recess 131 surrounding connection member 130. This recess can carry an O-ring (not shown) to seal against flow. Insert 129, connection member 130 and closure member 119 may be integrally formed as a single unit.

The hollow interior 132 of insert 129 is shaped to receive an Allen key (not shown). Rotation of insert 129 by means of an Allen key moves the insert upwardly or downwardly relative to bush 128 by the threaded engagement therebetween and thereby raises and lowers closure member 119. The diameter of insert 129 below its threaded portion is the same as the diameter of upper portion 119A of the closure member 119 and so is a sliding fit to move up and down inside passageway wall 118A.

When insert 129 is rotated to its lowest position the valve is fully closed. Movement of the insert in an upward direction is limited by an inwardly depending flange 128B at the upper end of bush 128 against which insert 129 engages when the valve is in the fully open position.

By this means the valve can be accurately set in a continuous sequence of gradually increasing or decreasing partially open configurations between fully closed and fully open.

It will be appreciated that this mechanical setting construction may be varied in a number of ways while achieving the same effect. For example, it is possible to dispense with separate bush 128 and to provide a thread on the internal wall of cylindrical extension 127 to co-operate with the thread on insert 129.

Figure 14:
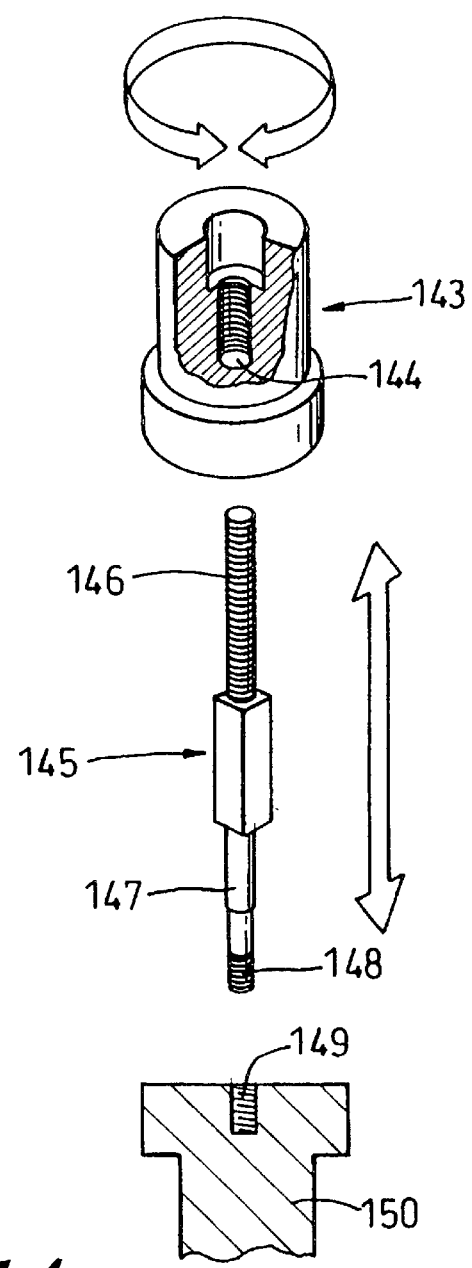
FIG. 14 is an exploded diagrammatic view showing another arrangement for accurate setting of the position of the closure member in a valve of the invention.

In FIG. 14 is shown schematically an arrangement for opening and closing a valve in a series of accurate steps using a conventional stepper motor.

Stepper motor 140 has a centrally-disposed stepped recess 141 into which stepped rotor 143 sits and where rotor 143 is caused to rotate in a clockwise or anti-clockwise direction as the windings 142 of the motor are pulsed appropriately and as is conventionally well known.

Rotor 143 contains a threaded centrally-disposed passageway 144 extending upwardly from its lower face.

A connection rod 145 has an upper threaded portion 146 of dimensions to threadingly engage inside the threaded passageway 144 and a lower extension 147 having an end portion 148 of dimensions to engage in a socket 149 in the end face of a valve closure member 150. A threaded engagement is shown in socket 149, although this is not essential.

Rod 145 is attached by conventional means (not shown) to the stepper motor 140 whereby when rotor 143 rotates within the stationary windings 142, rod 145 cannot rotate with the rotor. Thus when rotor 143 rotates in recess 141, threaded rod portion 146 is forced to move upwardly or downwardly within passageway 144. Thus the rotational movement of rotor 143 is translated into linear movement of rod 145, which moves upwardly or downwardly as the rotor rotates in a clockwise or anti-clockwise direction. By means of this linear movement of rod 145, closure member 150 is correspondingly moved upwardly or downwardly. (As there is no rotational movement of rod 145, the threaded engagement between end portion 148 and socket 149 is unaffected by the rotation of the rotor.).

The stepper motor rotor can be controlled by electronic pulses to rotate in a series of incremental steps and each step represents a particular partially open valve position. The number of steps can be large, e.g. several hundreds, whereby very accurate positioning of the closure member can be achieved, thereby giving very accurate flow control.

Figure 15:
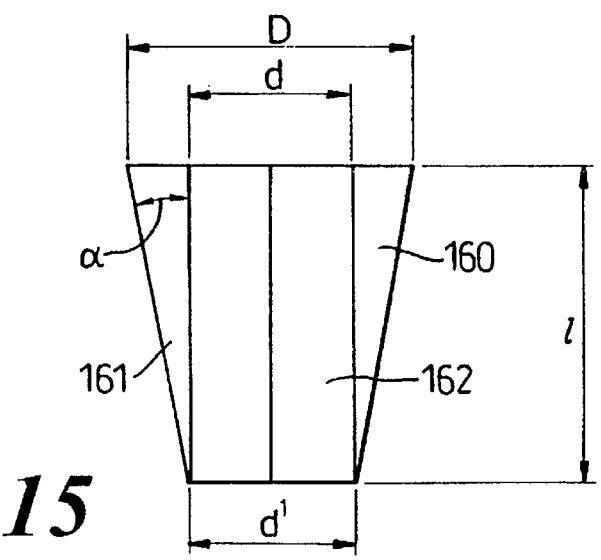
FIG. 15 is a diagrammatic view of a pair of V-grooves from a valve of the invention.

A typical pair of V-grooves 160, 161 is shown in FIG. 15, being opposed across a cylindrical passageway wall 162. The grooves have a length "l" and open at an angle "α". The passageway 162 has a diameter "d" and the diameter at the wider end of the grooves is "D". As shown, the narrow end of the grooves aligns with one end of the passageway to give an overall passageway diameter of "$d^1$", $d^1$ being slightly larger than d.

These dimensions may vary widely depending on the particular flow requirements desired and the skilled man of the art will readily be able to determine the desired combination of dimensions for his particular requirements. By way of example only, angle α may be from 1° to 20° but d, $d^1$ and l can vary widely.

In a specific example, the following dimensions were used:

α=10°;
l=10.82 mm;
d=6.18 mm;
$d^1$=6.55 mm; and
D=11.0 mm.

Figure 16:
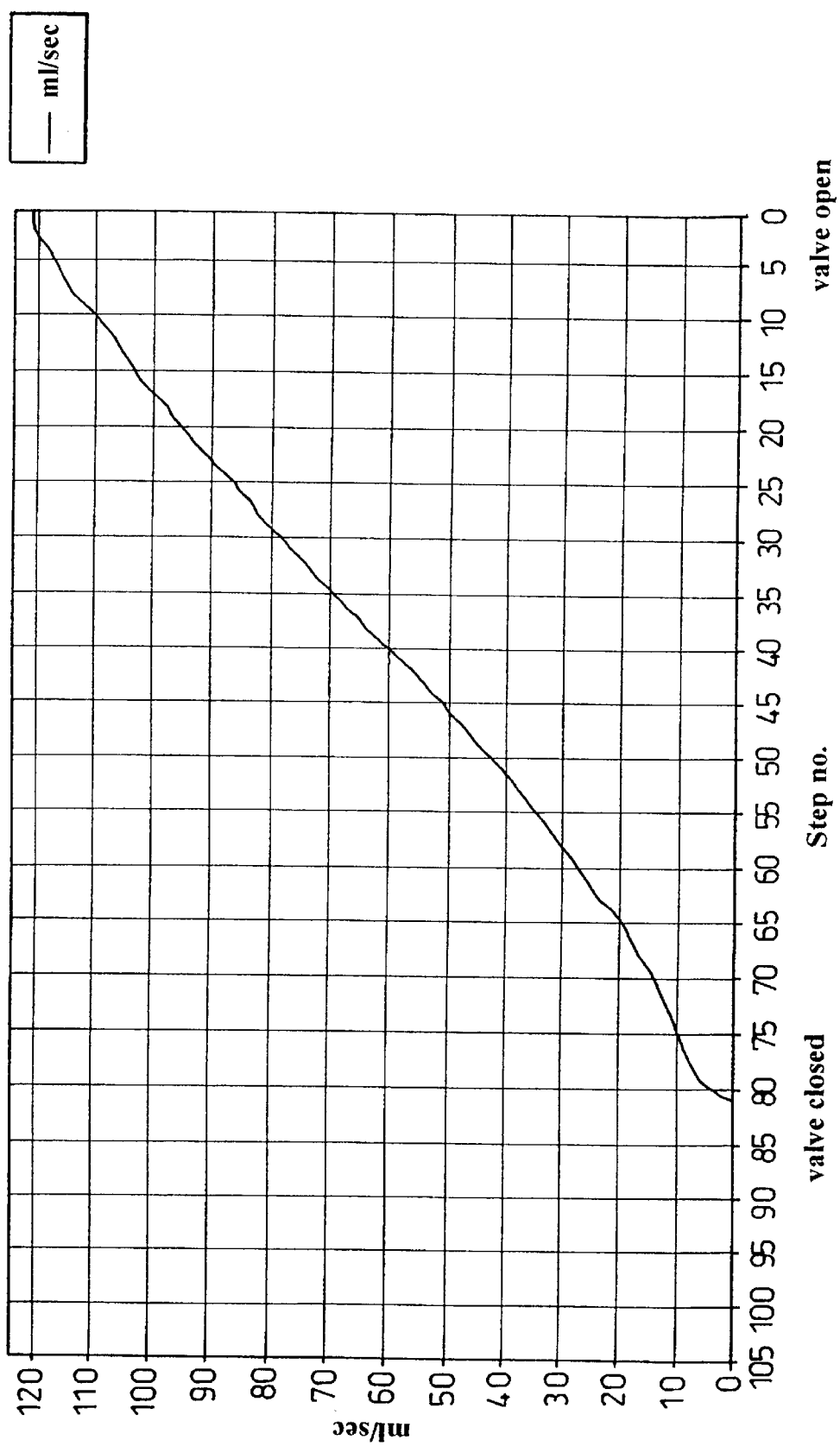
FIG. 16 is a graph of a flow curve for carbonated water using a valve of the invention having a pair of V-grooves of the type illustrated in FIG. 15 opposed across the passageway wall and in which the desired position of the closure member of the valve is achieved using a stepper motor.

A valve of the invention was set to open and close using a stepper motor as described above with reference to FIG. 14. The stepper motor was arranged to provide 328 steps between the fully open and fully closed valve positions. The full linear travel of the closure member was 10.82 mm so that each step moved the closure member 10.82÷328=0.033 mm. This is illustrated graphically in FIG. 16 which plots flow rate in ml/sec against the number of steps of rotation of the stepper motor. The valve was used to control flow of carbonated water at 80 psi supply pressure. (This is a typical operational pressure but it can vary widely, e.g. from 40 to 120 psi.).

Each step shown on the graph actually represents four steps in practice.

As can be seen, the flow curve closely approaches perfect linearity and this clearly demonstrates the excellent stepped flow control that can be achieved over a large number of incremental steps using this arrangement of the invention.

Thus the valves of the invention give excellent linear flow control from full flow to little or no flow. Moreover, the valves do not require excessive force to open and close them as they do not act against the prevailing fluid pressure. They do not need to draw power whilst not in use, in contrast to some known types of dispense valve.

Figure 17:
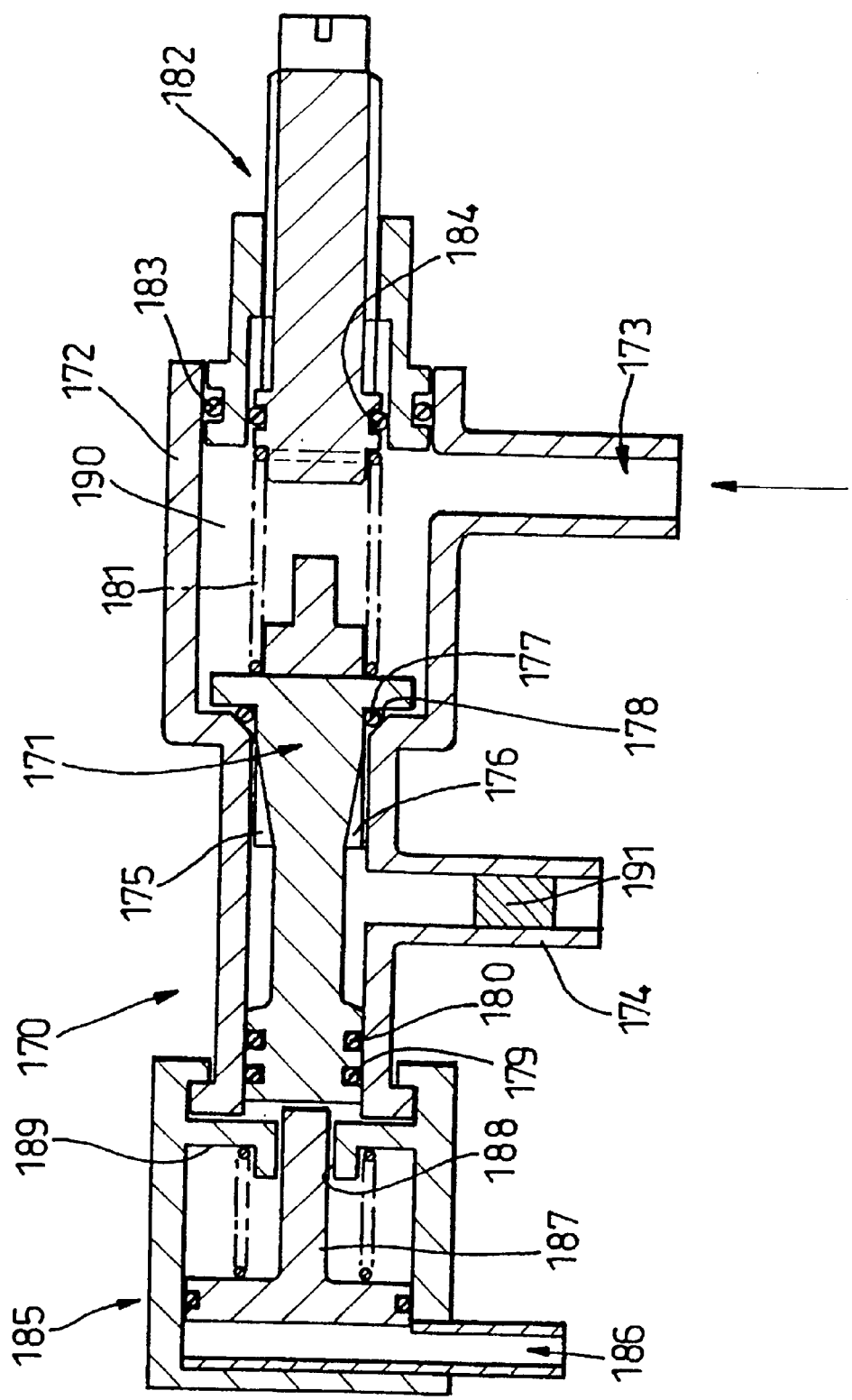
FIG. 17 is a section through a yet further valve of the invention.

In FIG. 17 is shown in sectional view another valve arrangement of the invention.

The valve 170 comprises a closure member 171 in a housing 172. Housing 172 has an inlet 173 and an outlet 174 for through flow of a fluid when the valve is partially or fully open. Closure member 171 has a flow groove configuration comprising V-grooves 175, 176 similar to those described above and will, therefore, not be described in detail here.

The valve is shown in the fully closed position with O-ring seal 177 adjacent a first end of closure member 171 sealing against an annular ledge 178 in the interior wall of the housing to prevent through flow. Adjacent its other second end, the closure member carries a pair of O-ring seals 179, 180 to prevent leakage between that end of the closure member and the wall of the housing. Movement of the closure member from left to right opens the valve.

The closure member is held in the closed position by a spring arrangement indicated at 181 and can be opened against the spring pressure by an actuator, to be described in more detail below, up to an amount determined by a setting mechanism indicated generally at 181. The setting mechanism, which is shown sealed into the housing 172 by O-rings 183 and 184, may be of any desired type. Thus, as indicated previously, it may be, for example, of the Allen key-operated type as described above with reference to FIG. 13, a stepper motor-operated type as described above with reference to FIG. 14, a proportional solenoid activator, a diaphragm-operated mechanism or a lever arrangement, and need not, therefore, be described in detail here.

The valve is actuated by an actuator mechanism indicated generally at 185. As shown, this is a "clip-on" gas pressure, e.g. $CO_2$, operated actuator. On actuation, $CO_2$ or other gas enters the actuator via its inlet 186 and the gas pressure forces a plunger 187 inside the actuator to move to the right, the plunger slidingly passing through an opening 188 in an end wall 189 of the actuator. The distal end of the plunger is in contact with the aforesaid second end of the valve closure member 171 and forces it to open against the pressure of spring 181 as far as the setting allowed by the setting mechanism 182. On ceasing actuation, gas flow ceases and the spring returns the valve to the closed position.

It will be appreciated that the spring controlled closure means acting on the closure member may be replaced by other means. For example, the plunger may be attached to the closure member to pull the closure member to the fully closed position when actuation ceases.

When the valve is used to control the flow of carbonated water, it is important that as little $CO_2$ as possible is forced out of solution in the water by the dispensing process through the valve, i.e. excess $CO_2$ "break out" must be avoided. As shown in FIG. 17, the carbonated water enters via inlet 173 into chamber 190 on the upstream side of closure member 171. The pressure drop between chamber 190 and inlet 173 may be sufficiently great to cause enough "break out" to result in a sub-standard drink. To avoid this happening, a restrictor 191 has been positioned across the outlet 174, i.e. on the downstream side of the closure member. This has the effect of reducing the overall pressure drop from the inlet to the outlet and thereby assists retention of $CO_2$ in the liquid passing through the valve.

The restrictor 191 may be, for example, a porous filter, an orifice or a fixed restrictor tube. Alternatively, it may be an adjustable restrictor which can be adjusted, e.g. automatically by a suitable control system.

The gas-operated actuator mechanism shown in FIG. 17 may be replaced by any other suitable actuator mechanism. For example, the actuation may be by a simple manual push arrangement, a lever actuator or a stepper motor.

In FIG. 18 is shown a heat exchanger 200 to cool a fluid F, whose flow is indicated by double-headed arrows, by means of a coolant C, whose flow is indicated by single-headed arrows. The fluid F may be, for example, a beverage to be dispensed and coolant C a conventional glycol/water mixture.

The heat exchanger 200 comprises an annular upper housing 201 and a lower body 202 through which the coolant can pass. Upper housing 201 contains a chamber 203 defined by an annular wall 204, the upper surface 205 of body 202 and a diaphragm 206 clamped around its perimeter to the top of wall 204 by a bell housing 207.

The fluid F can flow via an inlet 208 into chamber 203 and can exit the chamber via an outlet 209, both inlet and outlet being in wall 204.

Coolant C circulates from around a continuous loop GHIJ that includes a conventional refrigeration means (not shown). The loop has a branch 210 whereby coolant can flow into and through heat exchanger body 202 and, passing via a valve 211 of the invention, can exit the body 202 to return via a one way valve 212 to the loop at point I.

Valve closure member 213 is movable upwardly and downwardly as indicated by arrows C—C and is shown in its uppermost, valve closed position. The valve 211 comprises a passageway between a coolant inlet 214 and outlet 215 in the body 202. The passageway wall defines a pair of opposed grooves 216, 217 which broaden in the downstream direction. This is shown more clearly in FIG. 18A where it can also be seen that, adjacent its lower end, the closure member 213 has an annular groove 218 containing an O-ring 219 to seal against the wall of the passageway in the valve closed position.

The permitted degree of opening of the valve is set by a spring-loaded mechanism acting on diaphragm 206. The spring 220 is mounted inside bell housing 207 between an upper steel plate 221 and a lower steel plate 222 and sits on top of the diaphragm 206 with plate 222 in contact with the diaphragm. The spring is attached to the upper end of closure member 213 by means of a rivet or screw-threaded attachment 223 which passes through a central aperture in diaphragm 207.

The upper steel plate 221 is contacted by the lower end of an adjusting screw 224 which passes through an aperture in the wall of the bell housing. Rotation of screw 224 moves it upwardly or downwardly whereby a lesser or greater compression force is applied to spring 220 through plate 221. This force is transmitted through plate 222 to the diaphragm 207. The amount of this force determines the degree to which the valve 211 can open, i.e. it sets the valve position.

When fluid F is not being dispensed, chamber 203 is full of fluid F at a pressure of, for example 30 to 70 p.s.i. This fluid pressure balances the force applied to diaphragm 207 and the valve is closed. When fluid F is dispensed through outlet 209, e.g. by conventional means not shown, the fluid pressure in chamber 203 drops and the pressure from the spring on the diaphragm moves the closure member 213 downwardly to open the valve to the predetermined position. This allows coolant C to flow through the valve to apply cooling effect to the fluid F in chamber 203. Thus the degree of cooling applied is automatically adjusted to the need determined by the rate of frequency of drawing off fluid F.

When the flow of fluid F is stopped, the pressure in chamber 203 returns to its original value, the diaphragm is forced upwardly to recompress the spring to its original setting and the closure member is thereby moved upwardly to close the valve.

Valves of the invention may find applicability in a wide variety of fluid dispense arrangements.

They can be utilised as simple mechanical valves to dispense, e.g., a single syrup flavour, with delivery controlled by, e.g., pneumatic push button operation, mechanical lever operation or diaphragm operation.

They can be utilised in the single flavour arrangements with or without portion control or flow sensing or in multi-flavour delivery systems with similar controls

What is claimed is:

1. A flow control valve for controlling the flow rate of a liquid in a down stream direction from an inlet to and out of an outlet thereof, the flow control valve, comprising:
   a housing body defining a flow passage extending there through from the inlet to the outlet, and the flow passage having a flow control portion defined by a flow orifice, flow orifice sidewalls, and one or more grooves formed in the flow orifice sidewalls, and the one or more grooves having a cross-sectional area that decreases in a downstream direction along the flow orifice sidewalls,
   a rod extending through the housing and into and substantially coextensive with the flow passage and the rod linearly moveable by a linear drive means, the linear drive means electrically operable on command to relatively accurately and repeatedly move the rod to a plurality of positions, and the rod having a distal end portion opposite from the linear drive means for insertion into the flow orifice and the rod distal end portion having exterior sidewalls sized to lie closely adjacent the flow orifice sidewalls for substantially preventing fluid flow there between and the distal end portion for cooperating with a seat means positioned downstream of the flow passage control portion to prevent liquid flow through the flow passage when the rod is moved to a fully extended position by the linear drive means and the rod also moveable thereby to a fully retracted position for permitting maximum liquid flow and the linear drive means for moving the rod distal end portion to a plurality of positions along the one or more grooves for regulating the flow rate of the liquid as a function of the cross-sectional area of the one or more grooves.

2. The flow control valve as defined in claim 1, and the flow passage comprised of a first upstream leg section and a second downstream leg section, and the first and second flow passage leg sections extending transversely to each other and the flow control portion located within the second leg section and the rod substantially coextensive with the second leg section.

3. The flow control valve as defined in claim 1, one or more of said valves having the one or more outlets thereof fluidly connected to a common manifold.

4. A flow control valve for controlling the flow rate of a liquid in a down stream direction from an inlet to and out of an outlet thereof, the flow control valve, comprising:
   a housing body defining a flow passage extending there through from the inlet to the outlet, and the flow passage having a flow control portion defined by a flow orifice, flow orifice sidewalls, and one or more grooves formed in the flow orifice sidewalls, and the one or more grooves having a cross-sectional area that increases in a downstream direction along the flow orifice sidewalls,
   a rod extending through the housing and into and substantially coextensive with the flow passage and the rod linearly moveable by a linear drive means, the linear drive means electrically operable on command to relatively accurately and repeatedly move the rod to a plurality of positions, and the rod having a distal end portion opposite from the linear drive means for insertion into the flow orifice and the rod distal end portion having exterior sidewalls sized to lie closely adjacent the flow orifice sidewalls for substantially preventing fluid flow there between and the rod distal end portion for cooperating with a seat means positioned upstream of the flow passage control portion to prevent liquid flow through the flow passage when the rod is moved to a fully extended position by the linear drive means and the rod also moveable thereby to a fully retracted position for permitting maximum liquid flow and the linear drive means for moving the rod distal end portion to a plurality of positions along the one or more grooves for regulating the flow rate of the liquid as a function of the cross-sectional area of the one or more grooves.

5. The flow control valve as defined in claim 4, and the flow passage comprised of a first upstream leg section and a second downstream leg section, and the first and second flow passage leg sections extending transversely to each other and the flow control portion located within the first leg section and the rod substantially coextensive with the first leg section.

6. The flow control valve as defined in claim 4, and one or more of said valves having the one or more outlets thereof fluidly connected to a common manifold.

7. A flow control valve for controlling the flow rate of a liquid in a down stream direction from an inlet to and out of an outlet thereof, the flow control valve, comprising:
   a housing body defining a flow passage extending there through from the inlet to the outlet, and the flow passage having a flow control portion defined by a flow orifice and flow orifice sidewalls,
   a rod extending through the housing and into and substantially coextensive with the flow passage and the rod linearly moveable by a linear drive means, the linear drive means electrically operable on command to relatively accurately and repeatedly move the rod to a plurality of positions, and the rod having a distal end portion opposite from the linear drive means for insertion into the flow orifice and the rod distal end portion having exterior sidewalls sized to lie closely adjacent the flow orifice sidewalls for substantially preventing fluid flow there between, and one or more grooves formed in the rod distal end portion exterior sidewalls, and the one or more grooves having a cross-sectional area that decreases in a downstream direction along said end portion exterior sidewalls and the rod distal end portion for cooperating with a seat means positioned downstream of the flow passage control portion to prevent liquid flow through the flow passage when the rod is moved to a fully extended position by the linear drive means and the rod also moveable thereby to a fully retracted position for permitting maximum liquid flow and the linear drive means for moving the rod distal end portion to a plurality of positions along the flow orifice sidewalls for regulating the flow rate of the liquid as a function of the cross-sectional area of the one or more grooves.

8. The flow control valve as defined in claim 7, and the flow passage comprised of a first upstream leg section and a second downstream leg section, and the first and second flow passage leg sections extending transversely to each other and the flow control portion located within the second leg section and the rod substantially coextensive with the second leg section.

9. The flow control valve as defined in claim 7, and one or more of said valves having the one or more outlets thereof fluidly connected to a common manifold.

10. A flow control valve for controlling the flow rate of a liquid in a down stream direction from an inlet to and out of an outlet thereof, the flow control valve, comprising:

a housing body defining a flow passage extending there through from the inlet to the outlet, and the flow passage having a flow control portion defined by a flow orifice and flow orifice sidewalls, a rod extending through the housing and into and substantially coextensive with the flow passage and the rod linearly moveable by a linear drive means, the linear drive means electrically operable on command to relatively accurately and repeatedly move the rod to a plurality of positions, and the rod having a distal end portion opposite from the linear drive means for insertion into the flow orifice and the rod distal end portion having exterior sidewalls sized to lie closely adjacent the flow orifice sidewalls for substantially preventing fluid flow there between and the rod distal end portion exterior sidewalls having one or more grooves formed therein, and the one or more grooves having a cross-sectional area that increases in a downstream direction along said end portion exterior sidewalls and the rod distal end portion for cooperating with a seat means positioned upstream of the flow passage control portion to prevent liquid flow through the flow passage when the rod is moved to a fully extended position by the linear drive means and the rod also moveable thereby to a fully retracted position for permitting maximum liquid flow and the linear drive means for moving the rod distal end portion to a plurality of positions along the flow orifice sidewalls for regulating the flow rate of the liquid as a function of the cross-sectional area of the one or more grooves.

11. The flow control valve as defined in claim 10, and the flow passage comprised of a first upstream leg section and a second downstream leg section, and the first and second flow passage leg sections extending transversely to each other and the flow control portion located within the first leg section and the rod substantially coextensive with the first leg section.

12. The flow control valve as defined in claim 10, and one or more of said valves having the one or more outlets thereof fluidly connected to a common manifold.

13. A flow control valve for controlling the flow rate of a liquid in a down stream direction from an inlet to an outlet thereof, the flow control valve, comprising:

a housing body defining a first flow passage extending from the inlet and having a distal end portion, a proximal end portion and a piston chamber portion there between, a second flow passage extending transverse to the first flow passage and in fluid communication with the proximal end portion thereof and the outlet, the first flow passage distal end portion having a flow orifice, flow orifice sidewalls, and one or more grooves formed in the flow orifice sidewalls, and the one or more grooves having a cross-sectional area that decreases in an upstream direction along the flow orifice sidewalls, a rod sealingly extending through the housing and into and substantially coextensive with the first flow passage and the rod linearly moveable by a linear drive means, the linear drive means electrically operable on command to relatively accurately and repeatedly move the rod to a plurality of positions, and the rod having a distal end portion for insertion into the flow orifice and the rod distal end portion having exterior sidewalls sized to lie closely adjacent the flow orifice sidewalls for substantially preventing fluid flow there between, and the rod having a proximal portion forming a flow cavity between said rod proximal end and the proximal end of the first flow passage, and the rod having a piston portion positioned there along within the piston chamber, and the rod piston including sealing means for seating against the first flow passage proximal end for stopping the flow of liquid when the rod is moved by the linear drive means to a fully retracted position, and the rod also moveable thereby to a plurality of positions along the one or more grooves for regulating the flow rate of the liquid as a function of the cross-sectional area of the one or more grooves.

14. The flow control valve as defined in claim 13, and one or more of said valves having the one or more outlets thereof fluidly connected to a common manifold.

* * * * *